United States Patent
Christen et al.

(10) Patent No.: US 10,948,306 B2
(45) Date of Patent: Mar. 16, 2021

(54) METHOD AND APPARATUS FOR ROUTE PLANNING INCORPORATING CHARGING NEEDS

(71) Applicant: FORD GLOBAL TECHNOLOGIES, LLC, Dearborn, MI (US)

(72) Inventors: Erik J. Christen, Royal Oak, MI (US); Prasad Venkiteswaran, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 264 days.

(21) Appl. No.: 15/871,619

(22) Filed: Jan. 15, 2018

(65) Prior Publication Data

US 2019/0219411 A1   Jul. 18, 2019

(51) Int. Cl.
*G01C 21/34* (2006.01)

(52) U.S. Cl.
CPC ....... *G01C 21/3469* (2013.01); *G01C 21/343* (2013.01); *G01C 21/3476* (2013.01)

(58) Field of Classification Search
CPC .................................................. G01C 21/3469
See application file for complete search history.

(56) References Cited

U.S. PATENT DOCUMENTS

| 9,448,083 | B2 | 9/2016 | Loftus et al. | |
|---|---|---|---|---|
| 2014/0129139 | A1 | 5/2014 | Ellison et al. | |
| 2015/0158393 | A1* | 6/2015 | Kawano | B60L 53/65 320/109 |
| 2016/0231136 | A1 | 8/2016 | Hoch | |
| 2018/0202822 | A1* | 7/2018 | DeLizio | G01C 21/3407 |
| 2018/0350022 | A1* | 12/2018 | Stefan | G06Q 50/30 |
| 2019/0212157 | A1* | 7/2019 | Wu | G06Q 50/30 |

FOREIGN PATENT DOCUMENTS

DE   102016015402 A1   7/2017

* cited by examiner

*Primary Examiner* — Anne Marie Antonucci
*Assistant Examiner* — Abdalla A Khaled
(74) *Attorney, Agent, or Firm* — Michael Spenner; Brooks Kushman P.C.

(57) ABSTRACT

A system includes a processor configured to determine a projected vehicle arrival time at a destination point. The processor is also configured to determine a projected hailed-ride arrival time at the destination point and, responsive to the projected vehicle arrival time being within a predefined threshold of the projected hailed-ride arrival time, request a hailed-ride to arrive at the destination point.

6 Claims, 5 Drawing Sheets

ND APPARATUS FOR ROUTE
METHOD AND APPARATUS FOR ROUTE PLANNING INCORPORATING CHARGING NEEDS

TECHNICAL FIELD

The illustrative embodiments generally relate to methods and apparatuses for route planning incorporating charging needs.

BACKGROUND

As electric vehicles (EVs) and hybrid electric vehicles (HEVs) grow in popularity, there are an increasing number of charging options. Owners who used to only be able to charge a vehicle at home or at a special location, can now often find public charging points and/or commercial charging points. Since charging is a task that often takes a half hour or longer, however, using charging bays at commercial and public points typically relies on availability, as opposed to refueling points for gasoline, where decisions are often based on cost.

Nonetheless, cost may be a factor, and it may be more inexpensive to use a commercial charging point (or free public charging point) than a home charging point. The obvious downside of such a solution is that the user may have to remain at the public or commercial location for over an hour, in a worst-case scenario. This is often not a problem if the charging point is proximate to a workplace, but if the user is simply using a nearby point along a route, when charging is required, the user may be "stranded" at the charging point until recharging is completed.

SUMMARY

In a first illustrative embodiment, a system includes a processor configured to determine a projected vehicle arrival time at a destination point. The processor is also configured to determine a projected hailed-ride arrival time at the destination point and, responsive to the projected vehicle arrival time being within a predefined threshold of the projected hailed-ride arrival time, request a hailed-ride to arrive at the destination point.

In a second illustrative embodiment, a system includes a processor configured to determine a charging completion time. The processor is also configured to determine a projected hailed-ride arrival time at a driver location. The processor is further configured to determine a projected travel time from the driver location to a recharging point and, responsive to the projected hailed-ride arrival time plus the projected travel time placing a hailed ride at the recharging point within a predefined threshold of the projected travel completion time, request the hailed-ride to arrive at the driver location.

In a third illustrative embodiment, a system includes a processor configured to determine that a requested travel route exceeds a first travel area associated with a first vehicle. The processor is also configured to determine a hand-off point inside the first travel area. The processor is further configured to, responsive to the first vehicle traveling to within a threshold arrival time of the hand-off point, request a ride from a second vehicle projected to arrive at the hand-off point by the time the first vehicle arrives.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
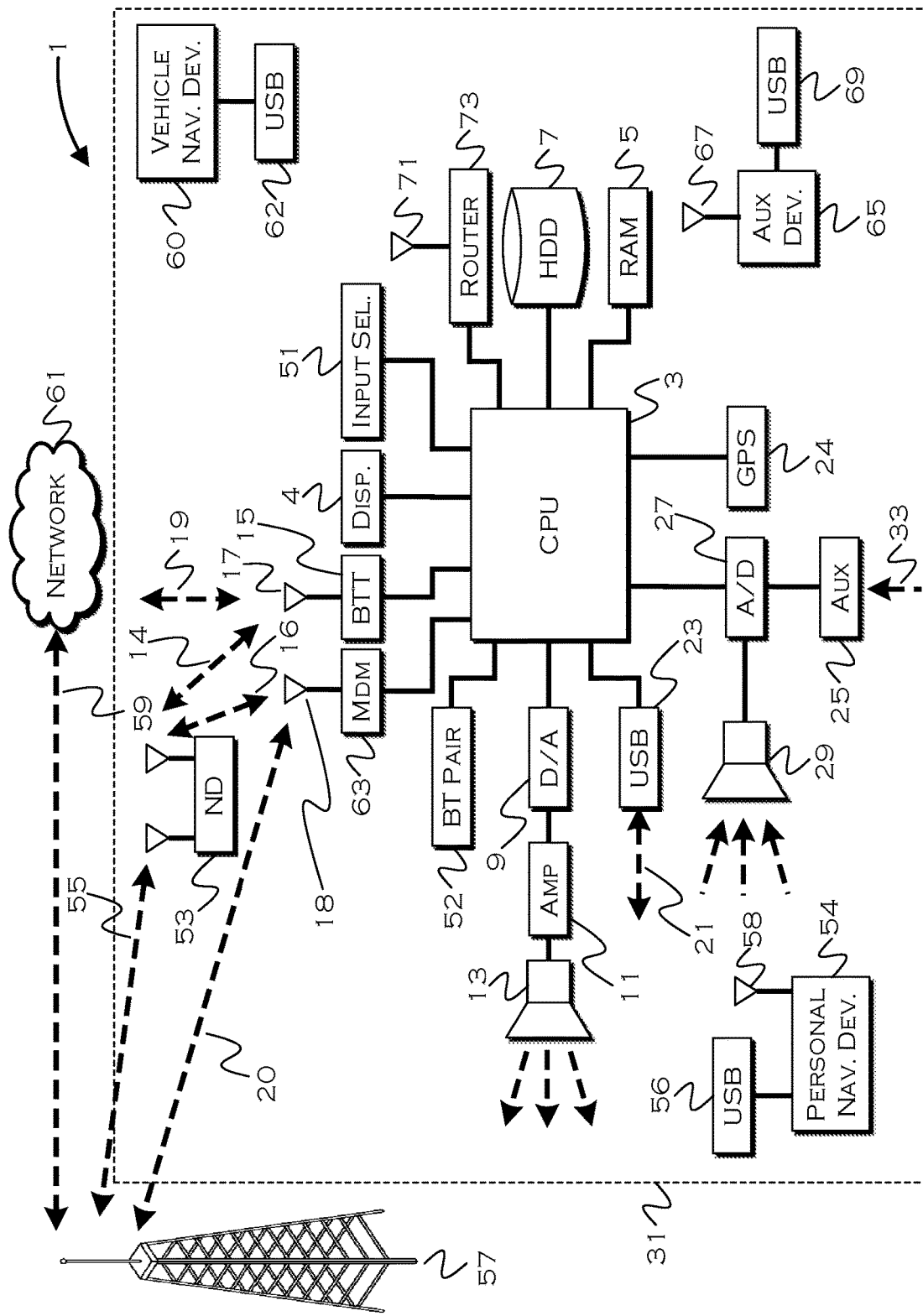
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose and present routing and charging solutions that allow users to make better use of time, by freeing the user from the charging location while the vehicle charges. The embodiments may also accommodate cost optimized models, if significant difference in price may be achieved through use of remote charging points (remote from home). Further, the embodiments accommodate "handoff" scenarios, whereby ridesharing services can transfer passengers for convenience and/or if charging is needed. Similar techniques can be used in an autonomous-vehicle (AV) on-demand model, where AVs can be hailed by passengers, but may have insufficient charge or range to complete a whole journey.

In a cost-sensitive embodiment, a user may input or request a destination and the vehicle (or a remote computer) may provide a fastest route and a cost-effective route. In this example, the fastest route is a direct route to the destination without a stop, whereas the cost-effective route considers the charging implications of a route compared to home-charging costs needed following route traversal.

Thus, the cost of a route can be calculated from a home charging perspective by determining the total distance traveled times the cost of charging at home. If home charging costs $1 per unit, and a route uses 25 units of charge, then the cost of home charging would be $25 to recharge the loss over the route.

A route that includes charging options Y and Z, but which may require more distance traveled, can be considered in terms of cost if the distance from start to Y, Y to Z and Z to destination is known. Assume that it requires 10 units of charge to reach Y, 15 units of charge to reach Z, and 8 units of charge to reach a destination. In this scenario, charging at Y costs $0.10 per unit and charging at Z costs $0.20 per unit. Thus, if the user begins with a full vehicle, the total cost is $1 at Y, $3 at Z and $8 at the destination (home) because the user still has to make up the last bit of used charge at home. But the total cost is still only $12 compared to $25, so the user who is cost-sensitive may come out ahead in this scenario, if time is not a factor. The charging route can become even cheaper if the user does not begin with a full charge (for example, if the 8 units is not made up at home), because the user can recharge the missing units at a possible significant discount.

Since there is significant wait time typically associated with charging, it is possible for a user to obtain some value from that time as well, to accommodate the difference in route timing by completing errands or other tasks. In the current models, a user has one of two options. Either the user can shop anywhere near the charging station (which may present limited options for errands), or the user can hail a ride or use public transportation to complete shopping elsewhere. Since ride hailing and/or waiting for transportation may take some time, unless the user plans an arrival perfectly, the user could spend 10 or 20 minutes of a one hour recharge waiting for a ride, then have to travel to a destination, then have to wait for a ride back, leaving potentially only 10-15 minutes of the hour for actual shopping. Accordingly, the illustrative embodiments provide an automatic hailing option that attempts to incorporate ride-hailing into timed arrival, so the user maximizes or nearly maximizes available errand time. The projected cost of the hailed ride could also be factored into the total cost of the charging-based route, if desired, but in some instances this may be considered an offset by the user which has value outside of the route because it allows the user to shop.

Accordingly, an illustrative scenario may be as follows. The user wants to travel the Y Z route above, in order to preserve charge and limit charging costs. The other advantage of this route is that the user arrives at the destination with only 8 units of charge less than when the user began, if the user began with full charge, and potentially even more units of charge than when the user began, if the user began with less than full charge. If it takes 4 minutes per unit to recharge, the recharge time at Y would be 40 minutes and at Z would be 60 minutes. Recharge times and units of charge are simplified in this disclosure for the sake of example.

If the user needs to eat a meal, which typically takes 25 minutes, and grocery shop, which typically takes 40 minutes, then the user should plan to eat near Y and shop near Z. Of course, in the absence of transportation, this is only possible if Y is near a restaurant and Z is near a grocery store. To accommodate this, the illustrative embodiments will provide an automatic ride-hailing option, which can use a ride-sharing service (or taxi service) and time an arrival of the hailed ride for the user's projected arrival time at Y and Z respectively. Thus, when the user arrives, or shortly before or after, the ride-hailed ride should arrive as well, maximizing possible utility of time.

Since the user knows approximately how long charging will take, assuming the charging point is available for the necessary time (which could have been accommodated in the route calculation), the system will also know when to hail a return ride, which should return the user to the station at or around the time charging is completed.

So, in the preceding example, the vehicle may note that it currently takes 10 minutes for a hailed ride to arrive at Y on average, and thus order a ride when the vehicle is 10 minutes away from Y. Since the user has 40 minutes of charging, if the user travels 6 minutes to a restaurant, 34 minutes remain. If the system notes that it currently takes 4 minutes for a hailed ride to arrive at the restaurant, then when 10 minutes remain, the system will hail the return ride, so that the 4 minute arrival time plus 6 minute journey back to Y should put the user at the vehicle at or around when charging is expected to be completed. This degree of precision is often not achievable with current systems, but the system can build in timing buffers to accommodate lacking precision (+X minutes on any or all journey legs), and can also accommodate traffic calculations and/or historic ridesharing pattern changes. A similar process can occur with respect to station Z, whereby the user can have a ride waiting upon arrival, head to a shopping center and maximize shopping time while still having a ready ride waiting and ready to return the user by the time charging at Z ends.

If the entire ridesharing system was all computer-controlled and highly predictable, a significant degree of precision could be achieved (such as with an AV type hailing system), but even in the absence of such a system, timing buffers can be built in which may reduce time optimization but may more realistically accommodate the degree of precision of existing systems. So, for example, the system may hail the vehicle for Y when the user is 12 minutes out, the system may plan 6 minutes for the post-lunch hail and 9 minutes for the post-lunch travel, reducing the total amount of time for eating to 19 minutes, and possibly incurring the cost of the hailed vehicle waiting for the passenger for a few minutes before the passenger vehicle (the one to be charged) arrives at Y.

Figure 2:
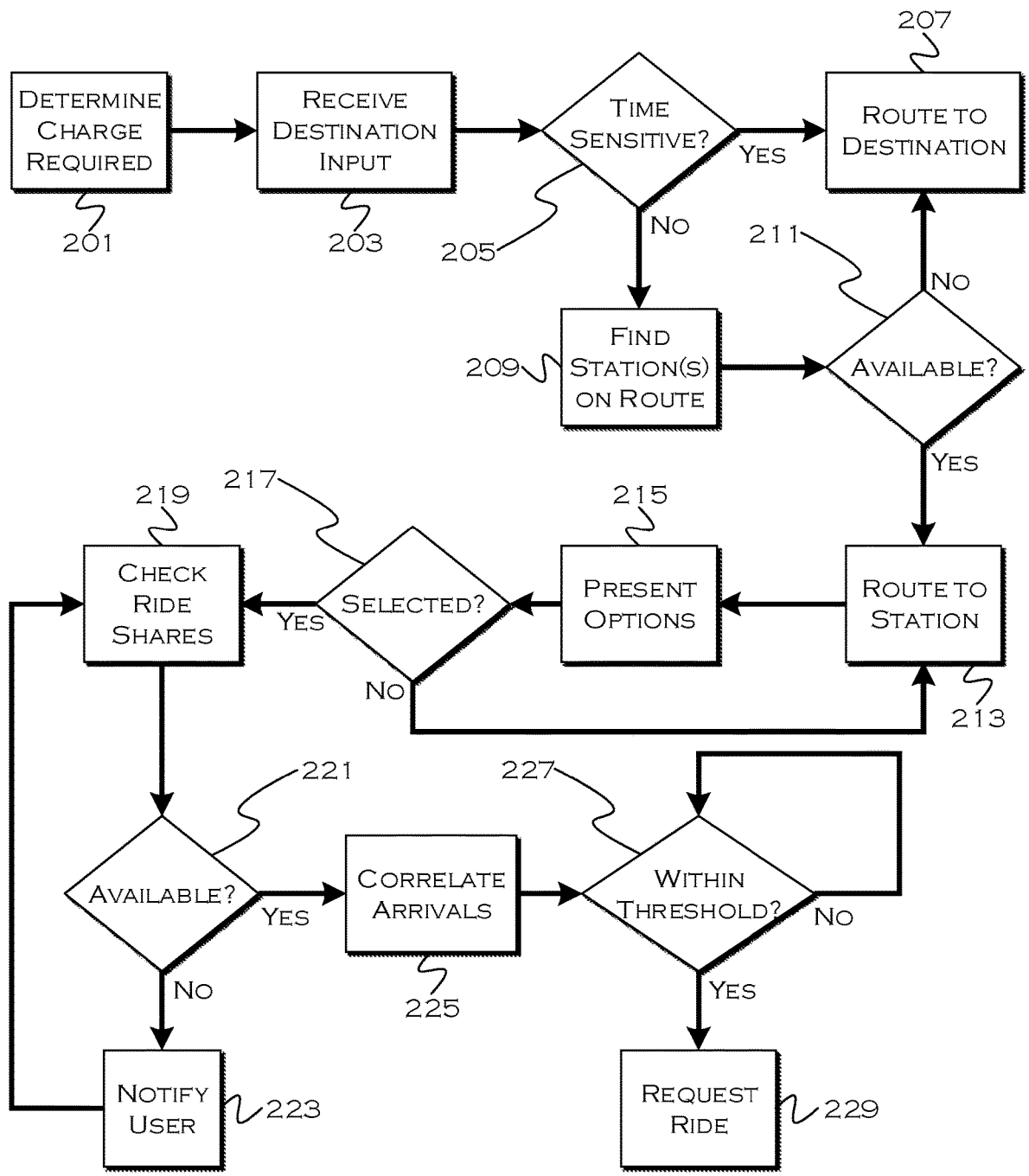
FIG. 2 shows an illustrative process for ride-hailing.

FIG. 2 shows an illustrative process for ride-hailing. In this example, the process determines 201 that a vehicle will require or may need a charge. This can include determining that the vehicle could benefit from a charge following a journey, which would often be the case unless the vehicle recharged at some point along the journey. In this example, the process also receives 203 a destination from a user, and determines 205 (based on previously obtained knowledge or user-indication) if the journey is time-sensitive. For example, if the user always arrives at work at 9 AM, if work is 30 minutes away on an optimal route, then the system may consider this a time sensitive journey. The user can also indicate a desire for a time-optimal route, or that may be a desired setting unless a charge (or final charge state) falls or will fall below a predefined threshold level (e.g., all journeys are to be considered time-sensitive, except when the charge will end/fall below 20%).

If the journey is time sensitive, the process simply provides 207 the fastest route available to the destination, much as a typical navigation system would provide a route. If the journey does not need to be the "fastest" route, the process finds 209 alternative route(s) with recharging stations. If there is at least one alternative route with a recharging station 211, the process will plan 213 a route including the charging station. If there are multiple options, the preferred route may be selected based on nearby ride-sharing characteristics and/or shopping options. That is, alternate route A may have an average ride-share wait of 2 minutes and 20 nearby stores and restaurants, and slightly faster alternative B may have an average ride-share wait of 7 minutes and 5 nearby stores and restaurants, generally making A the preferable route option even though it may be a slightly longer route. The balancing can be done automatically and/or based on user preferences. For example, in the preceding example, if the recharge time was 90 minutes, it may not really matter to a user which route option was taken (since there is time to take the shared ride further) and thus in that case the user might prefer slightly overall faster option B.

The system can choose a route for a user, or the system can present 215 alternate route options including a charging point. This presentation may also include, for example, the average current wait for a hailed ride and/or the proximity of food/groceries/malls, etc. Any information usable to help the user make the decision may be included in the route selection presentation process.

Once the user selects 217 a route, the process will begin to check 219 ride-sharing services available in the area. This could include, for example, taxis, ride-sharing (e.g. UBER/LYFT), AVs or other schedulable vehicles. The process attempts to correlate a vehicle arrival time with a hailed-vehicle arrival time, and if no hailed vehicles are available 221, the process may inform 223 the user.

As long as hailed vehicles are available or projected to be available, the process may attempt 225 to correlate arrival times. For example, if the user is currently 20 minutes away, and the average vehicle arrives at the recharging point within 10 minutes of a request, the system may wait to hail a vehicle. At 15 minutes away, the system may observe that the average vehicle now takes 13 minutes to arrive, if the 2 minute difference is within a tunable threshold (which could also be 0) 227, the process may request the hailed/schedulable ride. In the preceding scenario, even if the hailed ride is on time, the driver will only wait two minutes for the user. The threshold can be adjusted to accommodate expected variances in average wait time vs. real wait time, based on previous observation and/or additional information that may be provided by a ride-sharing backend, among other sources.

Figure 3:
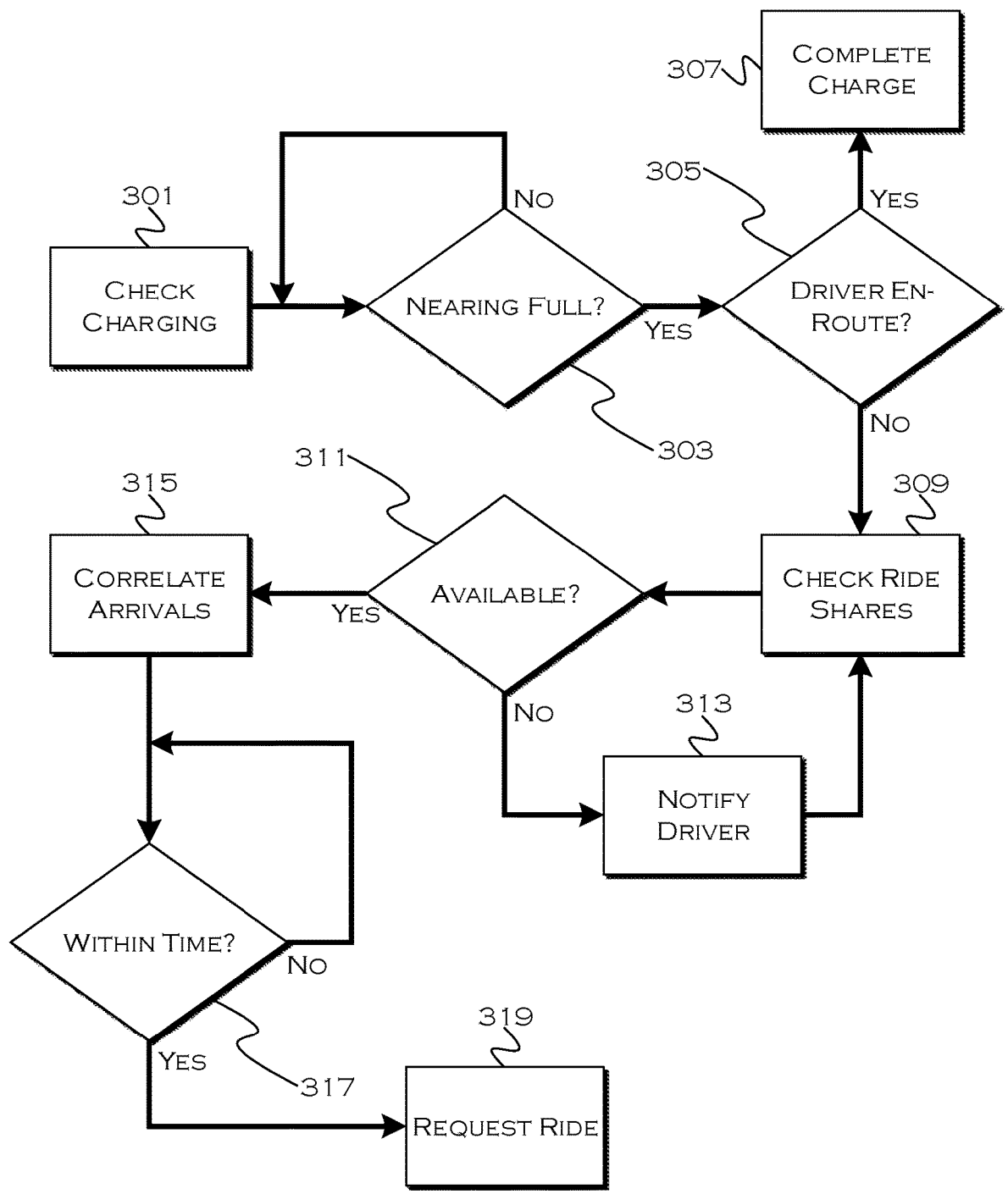
FIG. 3 shows an illustrative process for return-hailing.

FIG. 3 shows an illustrative process for return-hailing. Once the user has left a vehicle at a recharging point and traveled to a shopping destination, the user should plan to be back at the vehicle at or around the time recharging is completed and/or a reservation window ends. This illustrative process is not fixed around an appointment window, but could easily be adjusted to accommodate a time window instead of a recharge state. Here, the process checks 301 a current charge and determines if the charge 303 is almost complete. If the driver (of the recharging vehicle) is currently en-route 305 (if the driver has already hailed a ride back), the process can simply wait 307 for the charge to complete.

If the driver is not en-route, but the charging is nearing a threshold, the process may need to obtain a return ride. The threshold may be determined based on the driver's current projected return time, for example, or be based on a fixed time such as an appointment window's end. If the goal is for the driver to return when the vehicle has a full charge, and the driver traveled 7 minutes away to shop, and the average hail-time at the driver's current location is 8 minutes, then the threshold would be around 15 minutes from a full charge (the return hail plus travel time). If the same scenario existed and the goal was to return by the charging reservation end, the process would hail a vehicle 15 minutes before reservation's end. A buffer can also be built in again, to accommodate variances in real timing and to allow the driver to arrive slightly before the charging actually completes (e.g., use a 20 minute window instead of a 15 minutes window).

The process begins to search 309 for available rides and if none are available 311, the process may notify 313 the driver so the driver can make other accommodations as suitable. If a ride is available, the process will again attempt 315 to correlate driver arrival with recharging completion. Once the expected recharge completion time is within 317 a tunable threshold of the expected ride-hailing plus travel time back to the recharging point, the process may request 319 a return ride (with the pickup point being the driver's current location and the dropoff being the charging point). Since the process is capable of automatically managing the timing based on recharge/appointment windows, the process can request hailed vehicle services on behalf of the driver without the driver having to actually use a hailing application and/or guess at when it would be a good time to hail a ride back.

It is worth noting that the system can calculate time as a value or duration (e.g., 4:00 vs 15 minutes) to accommodate variations of the process without actually departing from the illustrative methods. Comparisons to expected arrival times may also be made in terms of actual time of day or time durations.

Figure 4:
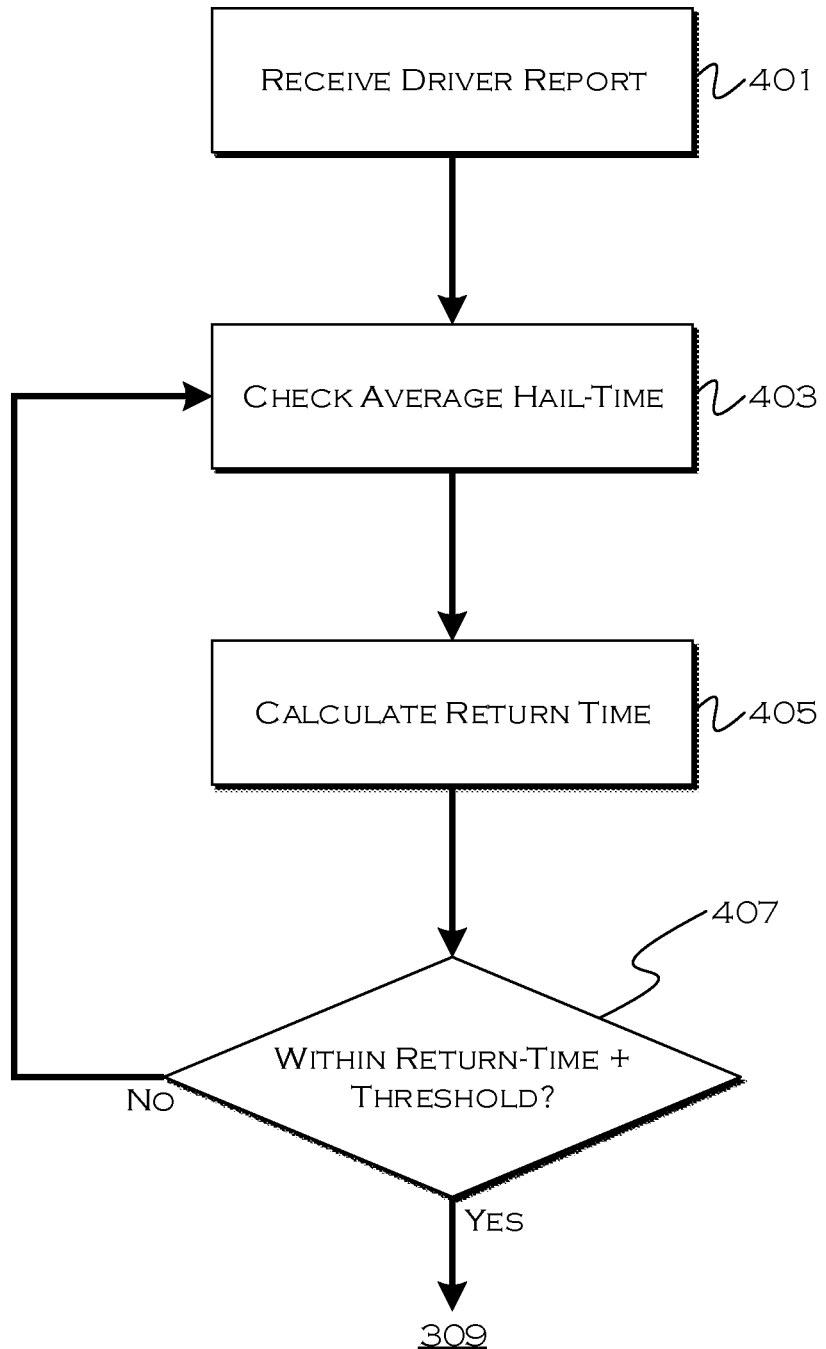
FIG. 4 shows an illustrative hail-planning process.

FIG. 4 shows an illustrative hail-planning process. This is an example of a process that can be used to plan when to hail a vehicle to time arrival of the vehicle with another time (arrival of a second vehicle, charging completion, etc). The process, in this example, receives 401 a report indicating how much time remains before the vehicle should arrive. This can correspond to when a hailed-vehicle should arrive for pickup or for dropoff, although this example is tailored to dropoff and thus includes a hailed-vehicle travel time calculation. In other examples, the travel time data could be excluded as appropriate.

The process determines 403 an average arrival time at a pickup location, which is a feature typically available in most ride hailing applications. Alternatively, the "hail-time" could be calculated based on an indicator of how long it should take to hail a vehicle, which is not necessarily an average. Ride-hailing applications working in conjunction with the illustrative embodiments may also provide more realistic or accurate measurements from a back-end, in order to better coordinate multiple variables.

In this example, the process also determines travel time for the hailed vehicle to a dropoff point, thus, the system now can "guess" when a vehicle will arrive for pickup and when a vehicle will arrive for dropoff. If the projected time(s) will place the vehicle wherever it should be 407 for the appropriate need (e.g., correlating a pickup or dropoff with another event), the process can proceed to attempt to hail 309 a ride. In this example, the process also determines the correlation with a buffer threshold built in, so that the system can accommodate drivers who want to arrive early and/or drivers who want to arrive late but do not mind paying any associated penalties.

So, for example, if the system receives driver information indicating that the driver is at location X, and the system determines that the hail time is 10 minutes, the travel time is 10 minutes and the threshold is 5 minutes early, the process would attempt to hail a ride 25 minutes before the expected need to be at the dropoff location. If the threshold were 5 minutes late, the system may attempt to hail the ride 15 minutes before the expected need to be at the dropoff location. Users may set and vary the thresholds, and/or the thresholds may be defined by the ride-sharing services to better accommodate working drivers, if the ride-sharing services are working in conjunction with the illustrative embodiments.

Figure 5:
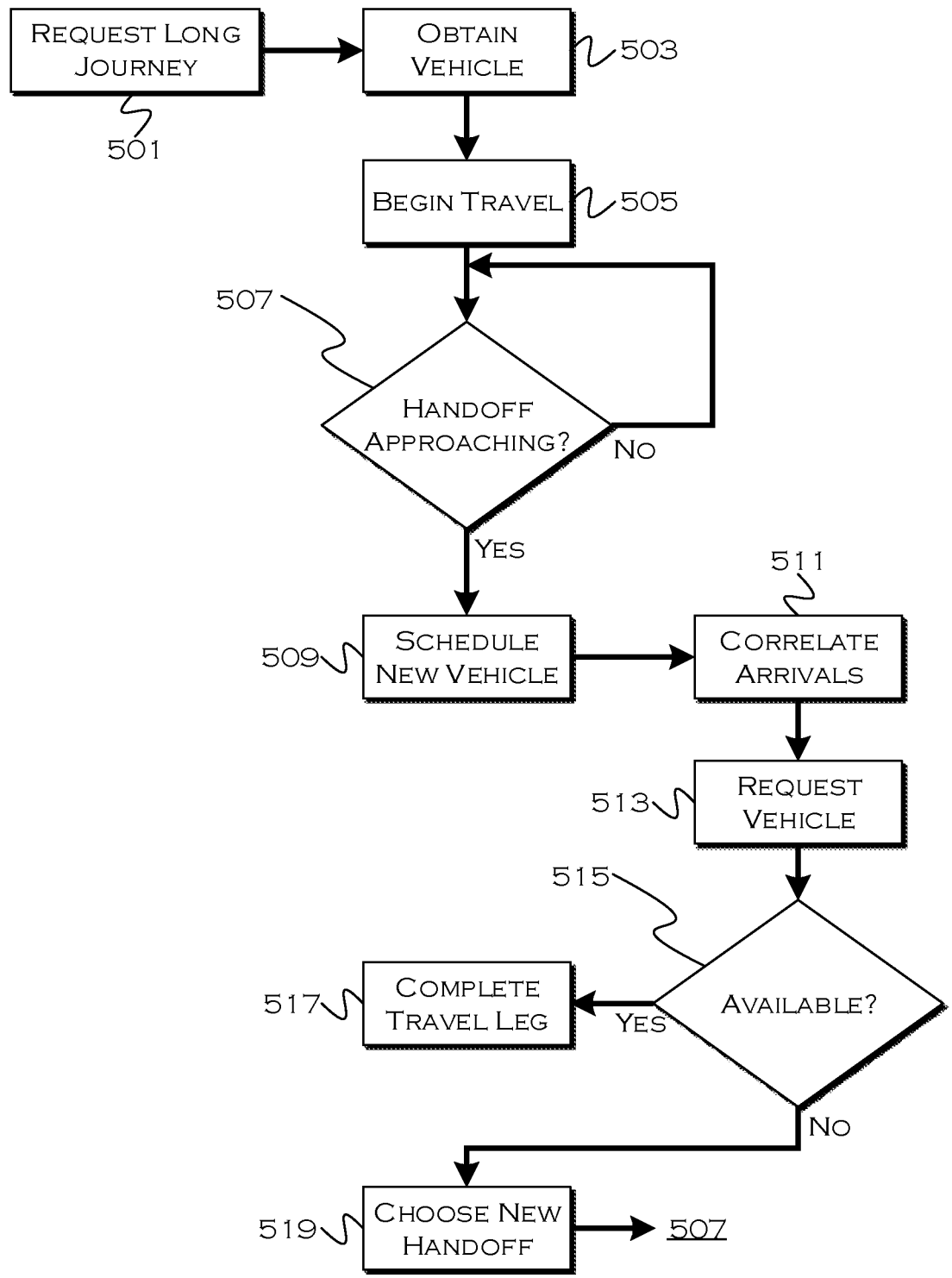
FIG. 5 shows an illustrative hand-off process.

FIG. 5 shows an illustrative hand-off process. In this illustrative example, a ride-sharing service may designate service areas for certain vehicles, and/or may include vehicles which periodically need recharging (such as AVs). The process works for either model, conceptually the broad notion is to time a handoff between two vehicles for whatever reason.

In this example, the user requests 501 a journey that would carry a first vehicle beyond a permissible zone and/or current charge range. So, for example, the user wants to travel from New York City to Chicago using AVs and/or ride-sharing. Since it may not be appropriate, in either case, to have a vehicle tasked with serving New York City travel all the way to Chicago, the process may obtain 503 a first vehicle that has a designated or possible travel distance in the general westerly direction from New York City to Chicago. Even if it were permissible to send an AV or driver from New York City to Chicago, the passenger may not want to incur the multiple recharging stops that might be needed along the way. While the passenger may elect to simply wait, the process may determine that for undelayed completion, the request may require multiple vehicles.

The passenger begins to travel in the first vehicle and the process tracks 505 the travel, until approaching 507 a range-edge or other designated boundary for hand-off. Typically, the process will begin to look for a second option when the first vehicle is within a threshold time or distance of a possible handoff point, so as not to attempt to schedule use of the second vehicle too late or too early.

The process can monitor projected vehicle arrival times at a handoff location as a first vehicle travels, and can even set a request threshold based on expected arrival times. So, for example, in one instance the process may look for second vehicles when the first vehicle is within 30 minutes or 20 miles of a destination. If the data found at that point indicates that it will take more than the remaining travel time for the second vehicle to arrive, the process could request the second vehicle immediately. This might require the rider to wait, however. In another example, to accommodate this, the process could monitor arrival times as the first vehicle travels, so that the threshold for scheduling a new vehicle is set (or set within a range) of an expected second vehicle arrival time. So, in that example, when the first vehicle begins traveling, the process may observe that the expected arrival time for a second vehicle at the handoff point is 30 minutes. But, when the first vehicle is 45 minutes away, that time may have changed to 42 minutes, in which case the process could immediately (or relatively immediately) schedule the second vehicle. In a similar manner, if the expected arrival time for the second vehicle had dropped to 20 minutes, the process could wait to schedule the second vehicle until 20 minutes away from the handoff, but continuing to check expected arrival times in case the threshold rose.

Whatever technique is chosen, the process attempts to schedule 509 the new vehicle and correlate 511 arrival times at a handoff point, and when the process determines that the expected arrival time for the second vehicles is within a tunable threshold of the expected first vehicle arrival time, the process can request 513 the second vehicle. If a vehicle is not available, the process may choose 519 a new handoff point and repeat the scheduling process. If the second vehicle is available, the process may complete 517 the leg of travel to the handoff, and resume for the new, second vehicle, in furtherance of obtaining a third vehicle, unless the second vehicle is capable of completing the journey.

The illustrative embodiments allow for correlation of multiple variables relating to ride-hailing and charging, and/or ride-hailing using multiple vehicles, in a manner that attempts to minimize traveler wait time or down time. Because less time may be lost, the process may result in improved utilization of hailed vehicles and/or the ability to range-restrict hailed vehicles without undue impact on passengers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
determine a projected charging completion time for a driver vehicle charging at a charging point;
determine a projected hailed-ride arrival time at a driver, of the driver vehicle, location different from the charging point;
determine a projected travel time from the driver location to the charging point; and
responsive to the projected hailed-ride arrival time to the driver location plus the projected travel time from the driver location to the charging point placing a hailed ride at the recharging point within a predefined threshold of the projected charging completion time, request the hailed-ride, to take the driver from the driver location to the charging point, to arrive at the driver location.

2. The system of claim 1, wherein the projected charging completion time includes time until a charging appointment end-time.

3. The system of claim 1, wherein the projected charging completion time includes time until a charge reaches a predetermined requested level.

4. The system of claim 1, wherein the processor is part of a vehicle computing system.

5. The system of claim 1, wherein the processor is part of a mobile device.

6. The system of claim 1, wherein the processor is part of a remote navigation assistance server.

* * * * *